Jan. 24, 1961 M. A. SALTZ Re. 24,929

DRAPERY HOOK DISPENSING AND INSERTING APPARATUS

Original Filed Nov. 22, 1955 3 Sheets-Sheet 1

MORRIS A. SALTZ
INVENTOR.

BY

Bernard Hiegel
ATTORNEY.

DRAPERY HOOK DISPENSING AND INSERTING APPARATUS

Original Filed Nov. 22, 1955 3 Sheets-Sheet 2

MORRIS A. SALTZ,
INVENTOR.

BY

Bernard Kriegel
ATTORNEY.

DRAPERY HOOK DISPENSING AND INSERTING APPARATUS

Original Filed Nov. 22, 1955 3 Sheets-Sheet 3

MORRIS A. SALTZ,
INVENTOR.

BY Bernard Kriegel
ATTORNEY.

United States Patent Office

Re. 24,929
Reissued Jan. 24, 1961

24,929

DRAPERY HOOK DISPENSING AND INSERTING APPARATUS

Morris A. Saltz, 1083 S. Ogden Drive, Los Angeles 19, Calif.

Original No. 2,821,713, dated Feb. 4, 1958, Ser. No. 548,502, Nov. 22, 1955. Application for reissue July 14, 1958, Ser. No. 749,044

28 Claims. (Cl. 1—1)

Matter enclosed in heavy brackets [ ] appears in the original patent but forms no part of this reissue specification; matter printed in italics indicates the additions made by reissue.

The present invention relates to apparatus for inserting hooks in drapes, curtains, or similar flexible articles, that are to be hung by the hooks from a suitable support.

An object of the present invention is to provide an apparatus for inserting drapery hooks into drapes, and like articles, in an effective and simple manner, instead of by hand.

Another object of the invention is to provide an apparatus for automatically feeding drapery hooks from a suitable supply, and inserting such hooks in drapery at any desired locations and in a proper manner.

A further object of the invention is to provide an apparatus for forcing the point of a drapery hook into the drapery material, feeding the hook along the drapery, and then forcing the point of the hook back into the drapery material, to insure secure attachment of the hook to the drape.

An additional object of the invention is to provide an apparatus for inserting a drapery hook into the drape at a seam thereof, with assurance that the hook will be forced into the material of the drape itself and not be merely disposed in the seam where it could possibly effect an eventual tearing of the line of stitching at the seam.

Yet another object of the invention is to provide an apparatus for inserting drapery hooks into drapes at desired points thereof, in which the apparatus is quickly adjustable to accommodate drapes of different thickness of material and of pleated portions.

Still a further object of the invention is to provide an apparatus for dispensing and inserting hooks into drapes and the like, and embodying an inexpensive contatiner for a stack of hooks to retain the hooks in appropriate position and to insure their automatic sequential feeding into the apparatus for insertion into the drape.

Another object of the invention is to provide an apparatus capable of inserting drapery hooks in fabric in a rapid and economical manner.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings.

Figure 1:
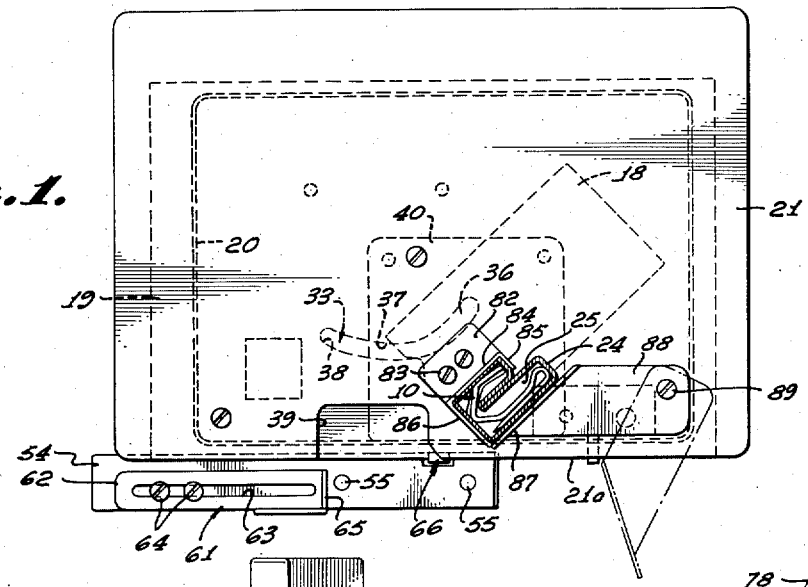
Figure 1 is a top plan view of an apparatus embodying the invention.

The apparatus disclosed in the drawings is designed to receive a drapery hook from a suitable supply, insert the point of the drapery hook pin portion into the fabric of a drape, or the like, then feed the pin along the drape, and when it has almost been disposed along the drape to its fullest extent, cause the point of the pin to move slightly in an outward direction to again pierce the fabric of the drape.

As specifically shown, each drapery hook 10 that is to be dispensed by the machine and inserted in the drape includes the pin portion 11 terminating in a forward point 12, the other end of the pin portion 11 merging into a curved web 13 which, in turn, merges into an inner arm 14 extending generally parallel to the pin portion 11. The outer portion 15 of the inner arm is bent outwardly at an angle, being inclined in a forward direction away from the pin portion. This bent arm portion 15, in turn, merges into a rearwardly and outwardly bent portion 16 of an outer arm 17, the rearwardly projecting portion of which is generally parallel to the inner arm 14 of the hook itself. In effect, the two inclined inner and outer arm portions 15, 16 form a general V-shape, in order that the drapery hook may be suspended from and carried by a suitable hanger (not shown), in a known manner.

The drapery hook 10 is adapted to be received within a slotted and recessed portion of a drive plate 18, which is slidably mounted upon an upper supporting plate 19 of the frame of the apparatus, this upper supporting plate being suitably secured to the vertical walls 20 of the housing frame, which encloses the drive mechanism. A top plate 21 is carried by the upper supporting plate 19 of the frame in spaced relation thereto, the distance between the two plates 19, 21 being slightly greater than the thickness of the hook drive plate 18, so they will appropriately guide and confine the latter during its sliding movement therebetween. The appropriate spacing between the top plate 21 and the supporting plate 19 is provided by spacer rings 22 disposed therebetween, the two plates being secured together by means of screws 23 extending through the top plate 21 and threaded within suitable holes in the supporting plate 19.

The drive plate 18 is adapted to be shifted to a rearward position in alignment with a supply of hooks 10, which are carried above the top plate 21, preferably within a suitable container or box 24. The hooks 10 are appropriately arranged in the box in the manner described specifically hereinbelow, being adapted to move singly from the lower end of the box, through an opening 25 in the top plate, into the slotted recess portion at the forward corner portion of the drive plate 18, which is designed to snugly accommodate a hook. Thus, the plate has a recess 26 in its front margin to receive the pin and inner arm portions 11, 14 of the hook, the recess being enlarged in an inward direction to accommodate the curved web portion 13 of the hook. The plate is further cut out to provide an inclined edge 27 conforming to the inclined portion 15 of the inner arm, this edge 27 terminating at an inclined slot 28 which conforms generally to the inclination of the inclined portion 16 of the outer arm 17 of the hook, this inclined slot merging into an inner slot portion 29 that is generally parallel to the front edge 30 of the plate, and which is designed to accommodate the straight portion of the outer arm 17. In effect, the recess and slot portions 26, 28, 29 define a driving dog or lug 31 of the plate having forward tapered sides 27, 32 adapted to engage the inclined portions 15, 16 of the hook, in order to effect a coupling of the hook 10 to the plate 18, whereby the hook can be driven in a forward direction by the plate.

The driving plate 18 is disposed at the front portion of the top plate 21, and is guided along a predetermined path by a cam slot device 33 formed in the supporting plate 19 of the frame. The plate 18 has a pair of spaced pins 34, 35 depending therefrom and adapted to be received in the cam slot 33. The pins have a diameter substantially equal to the width of the slot, so that the shape of the slot 33 produces a corresponding movement of the drive plate 18 and of the hook 10 coupled thereto. The cam slot has a rearward portion 36 inclined in a rearward direction away from the front of the machine. When the plate is shifted in a rearward direction, the pins 34, 35 will ride rearwardly in the slot and when the rear pin 34 engages the rear slot portion 36, it will angle the plate 18 to the position disclosed in Fig. 6, wherein the pin receiving portion 26, 28 of the plate is disposed under the opening 25 and the supply of pins 10. Some part of the plate 18 at all times lies under the opening 25 in the top plate 21 of the apparatus, and it is only when the slot and recess portion 26, 28 of the plate is disposed under the opening that a hook 10 can drop thereinto from the vertical stack or supply of hooks in the container 24. The drive plate 18 is substantially the same thickness as a hook 10, in order that the hook can slide along and between the top plate 21 and the supporting plate 19 of the machine.

Figure 4:
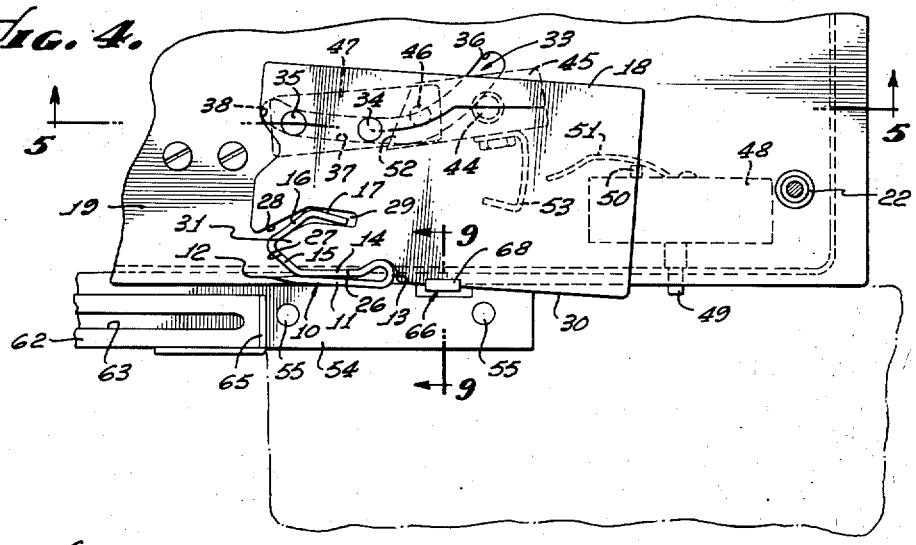
Fig. 4 is a fragmentary top plan view of a portion of the apparatus, taken along the line 4—4 on Fig. 5, showing the pin drive and inserting plate in its maximum forward position.
Figure 5:
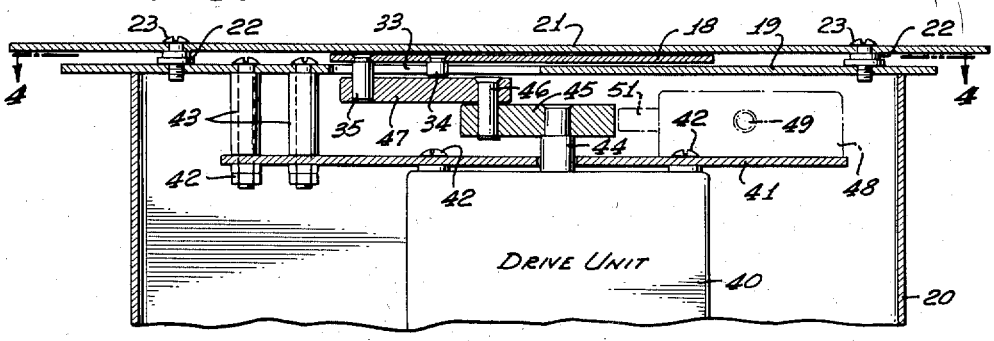
Fig. 5 is a vertical section taken along the line 5—5 on Fig. 4.

The rearwardly curved cam slot portion 36 merges into a substantially straight slot portion 37 that is generally parallel to the front edge 21a of the top plate. As the pin drive plate 18 is moved in a forward direction from the position shown in Fig. 6, it will carry the pin 11 in a forward direction, the point 12 of the pin being disposed at a substantial angle to the front edge 21a of the machine and to any drape or other material disposed in the plane of the pin (see plate 18 position in Fig. 7). As the plate 18 moves in a forward direction, it will pierce the point 12 of the pin into the fabric, whereupon the forward pin or follower 35 will ride along the relatively straight slot portion 37, the rear pin or follower 34 moving from the rear curved slot portion 36 toward and into the straight slot portion, in order to dispose the pin 11 substantially parallel to the fabric of the material, the plate 18 then occupying the position shown in Fig. 8. When in this position, the pin 11 has almost completed its forward motion, but the plate 18 and hook 10 are still movable in a forward direction to a small extent. From its straight portion 37, the slot has a short, inclined portion 38, slanting slightly toward the rear of the machine, so that a continued forward motion of the plate 18 then tends to shift the forward or slotted part of the plate in an upward direction, to cause the point 12 of the pin, which is now disposed within the fabric, to shift in an outward direction and thus pierce the fabric once again, which will prevent the pin 11 from moving freely within the fold of the drape. This final forward position of the plate is illustrated in Fig. 4. When in this position, the hook 10 is disposed in alignment with an opening 39 in the top plate 21 of the apparatus, which will enable the hook to be lifted upwardly by the operator out of the drive plate 18 and the apparatus.

In the apparatus sepecifically disclosed, the drive plate 18 is moved by a power device. Thus, an electric motor and a gear reducer unit 40 is carried by a supporting plate 41 disposed within the frame of the apparatus and suspended from the top supporting plate 19 of the frame by a plurality of bolts 42, the drive unit supporting plate 41 being spaced the appropriate distance below the frame supporting plate 19 by spacer sleeves 43 encompassing the bolts and extending between the plates. The vertical drive shaft 44 of the drive unit has a crank 45 affixed thereto to which a crankpin 46 is secured. This crankpin has one end of a connecting rod or link 47 pivotally secured thereto, the other end of the connecting rod being pivotally mounted on one of the pins, such as the forward pin or follower 35 attached to the drive plate.

Figure 6:
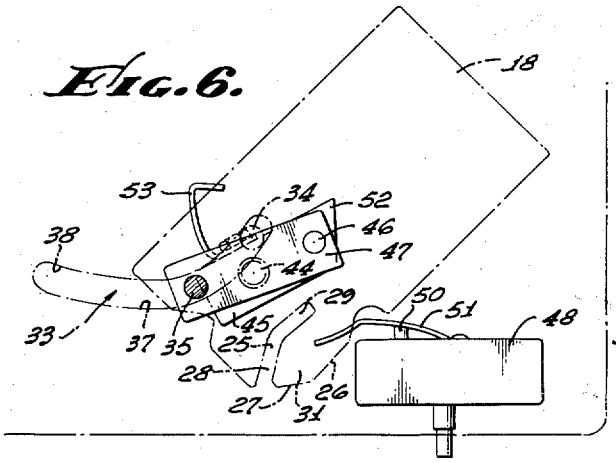
Fig. 6 is a somewhat diagrammatic top plan view of a portion of the apparatus showing the drive plate alone at its maximum rearward position for receiving a drapery hook.

As the drive shaft 44 is rotated by the drive unit 40, it will cause a reciprocation of the drive plate 18 through the agency of the crank 45, connecting rod 47 and the forward follower pin 35, the throw of the crank 45 being such as to move the plate between its full forward position disclosed in Fig. 4, and its full rearward position disclosed in Fig. 6.

The electric circuit to the motor unit 40 is controlled by a suitable stop and start switch 48 carried in any convenient manner, as by the drive unit supporting plate 41. This switch may have a starting button 49 projecting through a suitable hole or opening in the front wall of the frame or housing 20, and it also has a stop button 50 projecting from its rear. This stop button is actuated by a leaf spring arm 51 secured to the switch itself and overlying the button 50, and extending into the path of travel of the crank 45. The crank has a projecting portion 52 adapted to engage the free end of the arm 51, so as to actuate the stop button 50 and stop the apparatus when the drive plate 18 has shifted the pin point 12 of a hook up to the edge 21a of the machine, where the point is on the verge of being forced into the drapery fabric. The crank 45 has a second stop button operator 53 suitably secured thereto, which is adapted to engage the spring arm 51 to stop the drive unit 40 and the motion of the drive plate 18 when the pin portion 11 of the hook has been fully disposed in the drapery material, with its point 12 projected in the outward direction to pierce the material, such as disclosed in Fig. 4. Of course, between these two stopping positions, the starting button 49 is actuated by the operator to insitute operation of the apparatus once again.

The portion of the drape into which a hook is to be inserted is placed upon a platform or vertically movable supporting plate 54 disposed adjacent the front end of the apparatus, and below the plane of its top plate 21. This supporting plate 54 has a pair of generally vertical guide rods 55 secured thereto and depending therefrom, these guide rods being slidable through the spaced upper and lower flanges 56, 57 of a bracket 58 suitably secured to the front wall of the frame and housing 20. The supporting plate 54 is urged toward its uppermost position by helical compression springs 59 disposed around the guide rods 55, the lower ends of the springs engaging the lower flange 57 of the bracket and the upper ends of the springs engaging spring seats or collars 60 suitably secured to the guide rods 55 below the upper bracket flange 56. It will be noted that the supporting plate 54 can be depressed against the force of the springs 59, and that the relieving of the depressing force will cause the spring to elevate the supporting plate to its uppermost position, as determined by engagement of the spring seats 60 with the upper bracket flange 56.

A gauge 61 is slidably mounted on the platform or supporting plate 54, in order that hooks may be inserted in various types and sizes of drapes at a predetermined point from their upper edges. This gauge includes a generally horizontal portion 62 having a longitudinal slot 63 therein through which a plurality of screws 64 extends that are threaded into the supporting plate 54. The gauge terminates in an upwardly directed stop flange 65, against which the upper end of a drape can bear. By loosening the screws 64, the gauge 61 can be shifted along the supporting plate 54 to the desired position, depending upon the distance the hooks are to be inserted in the drape from its top edge. When the gauge 61 has been adjusted to the proper position, the screws 64 are retightened, to hold the gauge in such position.

Figure 9:
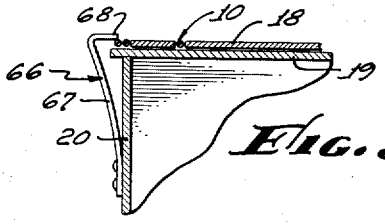
Fig. 9 is a vertical section taken along the line 9—9 on Fig. 4.
Figure 11:
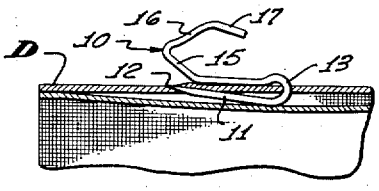
Fig. 11 is a view taken along the line 11—11 on Fig. 10.

The apparatus has a guide or indicator 66 (Fig. 9) to determine how far the operator must depress the supporting plate 54 to insure the insertion of a hook 10 at a drapery seam, or at any other desired location. This guide or indicator includes a leaf spring arm 67 attached to the front wall of the frame and housing, this arm extending above the plane of movement of the drive plate 18 and terminating in an inwardly directed finger 68 which is disposed just above such a drive plate. This inwardly directed finger is readily visible to the operator, who will place a portion of a drape on the supporting plate 54, and then exert a downward force on the drape until the supporting plate depresses to the point at which the seam of the drape, at which the hook is to be inserted, is in alignment with the finger 68. The operator then knows that during the operation of the machine the hook will be inserted in the drape at the proper location.

Figure 3:
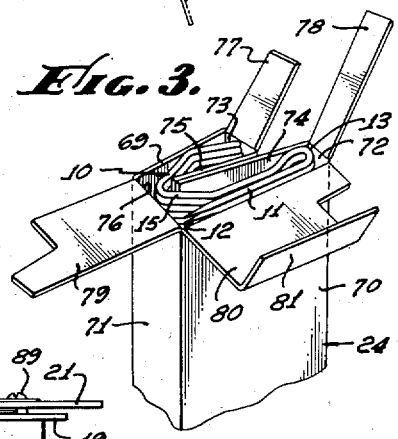
Fig. 3 is an isometric projection of a portion of a box containing a supply of drapery hooks, with the end of the box in open position.

As stated above, a stack of hooks is supported vertically in a suitable container 24, such as a plastic, paper or metal box. The specific box disclosed in the drawings, and more particularly in Fig. 3, is relatively inexpensive to make and serves as a means for storing a desired number of hooks 10 in proper stacked relation and for sequentially feeding such hooks into the recessed and slotted portion 26, 28 of the drive plate as they are needed. The paper box 25 includes opposed generally parallel side walls 69, 70 integral with a front wall 7. One of the side walls 70, in turn, merges into a back wall 72, whereas the other side wall 69 merges into another back wall 73 that is disposed forwardly of the first back wall 72. The back walls 72, 73 merge into respective inner walls 74, 57 that extend into the box between the side walls 69, 70 and, in effect, serve to divide the box into two vertically extending portions that have a communicating passage 76 at the forward portion of the box, by virtue of the fact that the inner walls 74, 75 terminate a substantial distance short of the front wall 71 of the box.

The drapery hooks 10 can be readily stacked in the box so far described, with the pin and inner arm portions 11, 14 disposed between one side wall 70 and the inner wall 74, the outer arm 17 being disposed in the box between the other side wall 69 and inner wall 75, the free ends of the inner walls 74, 75 being adapted to engage the V-shaped portions 15, 16 of the hooks to prevent any substantial movement of the latter within the box. The ends of the box may be closed by an inner end closure 77 integral with one of the back walls 73 adapted to be folded over the hooks to reach to the front wall 71. Another inner end closure 78 is integral with the other back wall 72, and may be bent downwardly to terminate at the front wall 71. After these inner end closures 77, 78 have been folded into place, an intermediate end closure 79, which is shaped to conform to the cross-section of the box, may then be folded over the inner end closures, after which an outer cover 80 integral with the side wall 70 may be folded over the intermediate end closure 79 and a flap 81 integral with this cover inserted in the box alongside the inner surface of the shorter side wall 69. The cover 80 is shaped to cover the compartment between one side wall 70 and the inner wall 75, the balance of the cover being somewhat shorter, so as to cover the compartment spaced between the inner wall 75 and the other side wall 69. When an end of the box has been closed, with the flap 81 inserted in place within the box, the box construction is held in place, the closing of the other end of the box, which is formed with the closure and cover members 77 to 81 like the end disclosed in Fig. 3, will complete the box and confine a supply of stacked hooks 10 within it.

The box 24, with a supply of hooks 10 therein, is suitably supported in vertical position on the apparatus within a box holder attached to the top plate. This box holder has a base portion 82 attached to the top plate 21 in any suitable manner, as by means of screws 83, from which an inner side wall 84 extends that has a width corresponding to the shorter side wall 69 of the box. A short back wall 85 is disposed substantially at right angles to the side wall 84 and is of a width corresponding to the length of the back wall 73 of the box. A front wall 86 extends at right angles to the side wall 84 and is of a width corresponding to the front wall 71 of the box. The support for the box also includes a vertical gate wall 87 adapted to be disposed against the longer side wall 70 of the box, this gate wall being secured to a flat horizontal portion 88 pivoted to the top of the apparatus, as by means of a pivot screw 89. The gate 87 is swung about its pivot screw 89 to an open position, such as shown in broken lines in Fig. 1, which will allow the box 24 of hooks to be inserted in appropriate position in the apparatus, between the back, side and front walls 85, 84, 86 of the holder, whereupon the gate 87, 88 is shifted to closed position to form another confining side wall 87 securing the box of hooks in the appropriate vertical position over the opening 25 in the top plate 21. Of course, before a box of hooks is inserted in place, the inner end closures 77, 78, intermediate end closures 79, and cover 80, 81 will be torn from the bottom end so that the latter is open, to allow a successive downward feeding of the hooks 10 into the drive plate slot end recess portions 26, 28.

In the use of the apparatus described, the gauge 61 is adjusted to the appropriate position and a portion of the drape that is to have a hook inserted therewithin is placed on the top supporting plate 54, with its end disposed against the gauge flange 65. The supporting plate 54 is then depressing against the force of the springs 59 until the seam of the drape is disposed in alignment with the indicator finger 68. The switch starter button 49 is then manipulated, which will cause the drive plate 18 to be shifted from an initial starting position disclosed in Fig. 4 to the rearward position shown in Fig. 6, the cam slot 33 appropriately turning the plate at an angle to the forward edge 21a of the top plate, wherein it is disposed under the supply of hooks 10 in the box 24. During such rearward movement of the plate, it covers the opening 25 in plate 21 and prevents hooks from dropping out of the box, until its slotted, recess portion 26, 28 becomes aligned with the stack of hooks. When this occurs, the lowermost hook in the box is dropped into the slot and recess portion, which can only accommodate a single hook. As the drive unit 40, crank 45 and connecting rod 47 continue to rotate, the plate 18 will then be driven in a forward direction, the point 12 of the pin 11 being on the verge of being inserted into the drape. When such position is reached, the projection 52 on the crank arm engages the stop button operating arm 51, to shift the switch to a circuit opening position, to stop the drive unit, which may, if desired, have a suitable magnetic brake incorporated therein to insure a rapid stopping of the apparatus. Before the mechanism stops, the projection 52 rides off the arm 51. The operator can then ascertain that the drape is in a proper position on the supporting plate 54, and that the supporting plate has been shifted vertically to the proper position with respect to the gauge finger 68, whereupon the starting button 49 will again be depressed, which will cause the driving mechanism to shift the plate 18 in a forward direction, piercing the point 12 of the pin into the fabric of the drape at its seam and then shifting the pin 11 and the inner arm 14 lengthwise along the drape, as indicated in Fig. 8, until the cam slot again shifts the forward portion of the drive plate in a direction outwardly of the drape, to cause the point 12 of the pin to again pierce the fabric of the drape. When this has occurred, the switch operating member 53 on the crank member will have engaged the stop button operating arm 51, to again stop the drive mechanism, the parts occupying the position shown in Fig. 4. When in this position, the hook 10 is disposed in alignment with the opening 39 in the top plate, permitting the drape to be lifted upwardly to remove the arm portions 14 to 17 of the hook from the drive plate 18.

Figure 7:
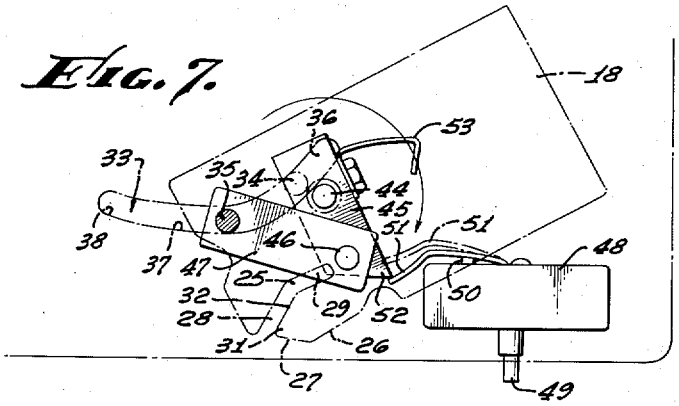
Fig. 7 is a view similar to Fig. 6, disclosing the position of the drive plate when the pin is on the verge of being inserted into the drape.
Figure 8:
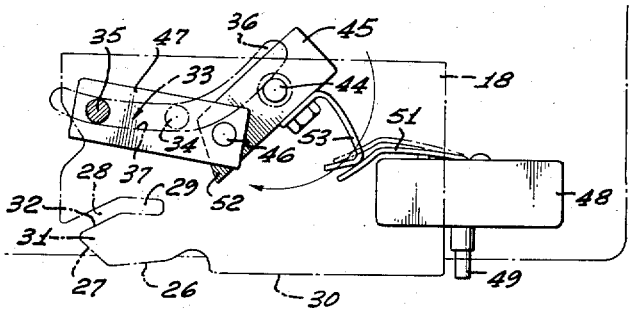
Fig. 8 is a view similar to Fig. 6, disclosing the apparatus near the end of its forward position during the insertion of the hook in a drape.

The operator then places another portion of the drape on the supporting plate 54 and again pushes the starter button 49, which will again actuate the mechanism to shift the plate to the position shown in Fig. 6, wherein it will pick up the next succeeding hook 10, which will become coupled to the drive plate, the parts again coming to rest in the position shown in Fig. 7, when the crank arm projection 52 again actuates the switch stop button 50. After assurance that the drape is in the proper position with respect to the guide or finger 68, the starting button 49 is again depressed and the hook 10 is driven into the fabric of the drape and along the drape, the point 12 being moved again in an outward direction to a slight extent to again pierce the fabric, as disclosed in Fig. 4. This hook 10 can then be removed from the drive plate through the opening 39.

The foregoing cycle is then repeated as often as necessary to insert hooks into the drapes at the desired locations.

Figure 2:
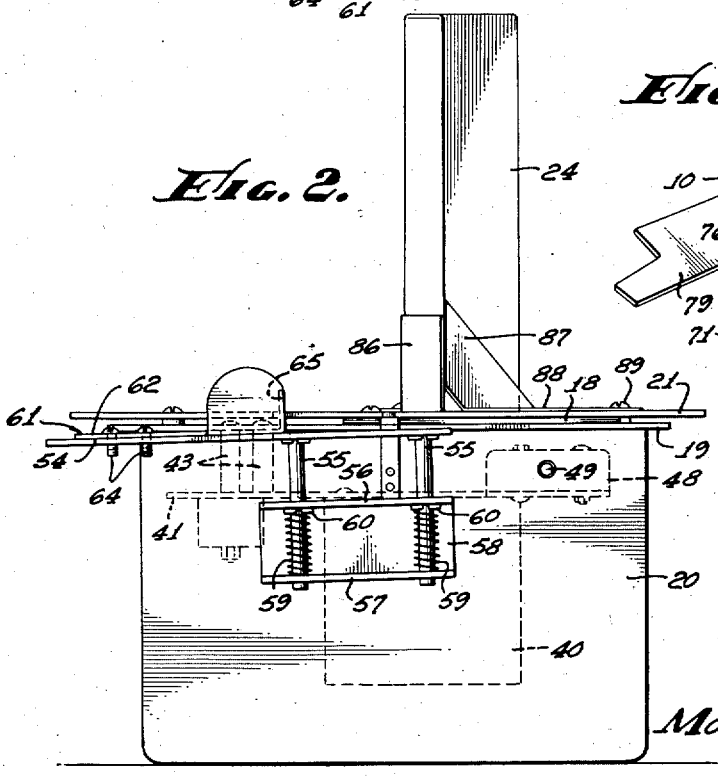
Fig. 2 is a front elevational view of the apparatus.

The hooks 10 are normally inserted at a seam of the pleated portion of the drape. However, it is not desired for the pin portion 11 of the hook to be disposed within and in alignment with the line of stitching at the seam, since such stitching may be torn. Instead, it is desired that the point 12 of the pin enter and be secured in place by the fabric of the drape itself. This is accomplished automatically in the apparatus disclosed in the drawings by the expedient of inclining the supporting plate 54 in a downward direction toward the left side of the apparatus, as disclosed in Fig. 2. The extent of inclination need not be very great, and can be achieved simply by inclining the bracket 58 through which the guide rods 55 extend, the guide rods being normal to the bracket flanges 56, 57, which will place the supporting plate 54 in the desired inclined position.

Figure 10:
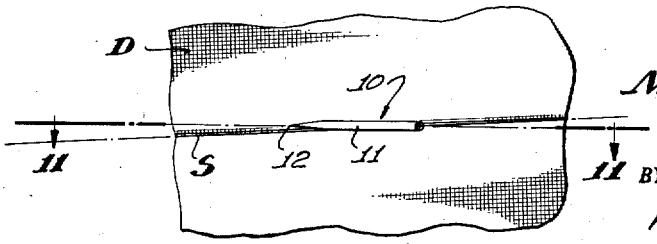
Fig. 10 is a diagrammatic view disclosing the insertion of a drapery hook at a seam of a drape.

With the supporting plate 54 in an inclined position, the seam of the drape placed thereupon will then be disposed in an inclined position with respect to the drive plate 18 and the hook 10 mounted therein. Thus, when the point 12 of the pin is forced into the drape D at the seam S, it will not travel along the seam, but will be inserted into the fabric itself, inasmuch as the pin 11 is disposed at a slight angle to the seam S, such as shown somewhat diagrammatically in Fig. 10. As the drive plate 18 projects the pin along the drape, it will move along the drapery material itself, and not along the seam or line of stitching S. Finally, when the point 12 of the pin is again projected in an outward direction, it will be projected into the fabric itself, since by this time the point is disposed a substantial distance (which need actually be only a slight distance R) from the seam or line of stitching, such as disclosed in Fig. 10.

It is, accordingly, apparent that an apparatus has been provided which is capable of automatically dispensing and inserting hooks into drapery in a highly effective manner and at the desired locations of the drape. A secure attachment of each hook to the drape is insured, the pin portion of the hook being disposed and attached to the drapery material itself, and not being supported only by the seam of the drape. The apparatus is readily adjustable to accommodate drapes, or similar articles, of various thicknesses merely by depressing the supporting plate 54 to the desired position until the seam S at which the hook is to be inserted is opposite the hook itself, as determined by the guide or indicator 66. A substantial supply of hooks can be easily mounted in the paper box or container 24, which will hold the hooks in a proper stacked relation, one above another, and which box can be manufactured from a single sheet of material, being formed in an easy manner without the need for gluing, stapling, or otherwise adhering any of the box parts to one another. The configuration of the box itself holds the hook portions in proper relation to each other and confines the hooks against loss therefrom.

The inventor claims:

1. In apparatus for inserting hooks in drapes and the like; a support having a surface upon which the drape can be held with its plait in a folded condition and the seam of the drape facing rearwardly of the support; a drive member adapted to receive and be coupled to a drapery hook having a pin portion, said drive member being disposed in a plane generally parallel to and offset from the plane of said support surface; cam means operatively connected to said drive member to guide said drive member and hook from a position in which the pin portion is inclined to the drape to enable such portion to be forced by the drive member into the drape, said cam means then guiding said drive member along a path lengthwise of the drape to substantially fully dispose the pin portion in the drape.

2. In apparatus for inserting hooks in drapes and the like: a support for a drape; a drive member adapted to receive and be coupled to a drapery hook having a pin portion; cam means operatively connected to said drive member to guide said drive member and hook from a position in which the pin portion is inclined to the drape to enable such portion to be forced by the drive member into the drape, said cam means then guiding said drive member along a path lengthwise of the drape to substantially fully dispose the pin portion in the drape; said cam means shifting said drive member in a direction outwardly of the drape, after the pin portion has been substantially fully disposed in the drape, to force the point of the pin portion back into the drape.

3. In apparatus for inserting hooks in drapes and the like: a support for a drape; a drive member adapted to receive and be coupled to a drapery hook having a pin portion; cam means operatively connected to said drive member to guide said drive member and hook along a path with respect to said drape; and means for reciprocating said drive member with respect to said cam means between a rear position at which the drive member portion forces the pin portion into the drape to a forward position lengthwise of the drape, said cam means forcing the point of the pin portion in an outward direction into the drape at said forward position.

4. In apparatus for inserting hooks in drapes and the like: a support for a drape; a drive member having an opening therein to receive a drapery hook having a pin portion terminating in a point; means for supporting a supply of drapery hooks; cam means operatively connected to said drive member to guide said drive member along a path from a first position aligned with said supporting means to allow a hook to shift into said drive member opening and be coupled to said drive member, to a second position at which the pin portion of the hook is inclined to the drape to enable said drive member to force the point into the drape, along a path generally lengthwise of the drape to a third position at which said pin portion is substantially fully disposed within the drape and the pin portion is inclined in a direction outwardly of the drape to cause the drive member to force the point of the pin portion back into the drape at said third position; and means for reciprocating said drive member with respect to said cam means between said first and third positions.

5. In apparatus for inserting hooks in drapes and the like: upper and lower guide members, one of said members having a front edge; a support for a drape adjacent said front edge; a drive plate between and slidable along said members, said plate having an opening to receive a drapery hook provided with a pin portion terminating in a point, said upper member having an opening overlying said plate; means for supporting a supply of drapery hooks in alignment with said upper member opening; means providing a slidable cam connection between said drive plate and one of said members to guide said plate along a path from a first position in which said plate opening is aligned with said upper member opening to allow a hook to shift into said plate opening and be coupled to said plate, to a second position at which the pin portion of the hook is inclined to the drape to enable said plate to force the point into the drape, along a path lengthwise of said front edge to a third position at which said pin portion is substantially fully disposed within the drape and the pin portion is inclined in a direction outwardly of the drape to cause the plate to force the point of the pin portion back into the drape at said third position; and means for reciprocating said plate along said guide members between said first and third positions.

6. In apparatus for inserting hooks in drapes and the like: spaced upper and lower guide members, one of said members having a front edge; a support for a drape adjacent said front edge; a drive plate between and slidable along said members, said plate having an opening to receive a drapery hook provided with a pin portion terminating in a point; said upper member having an opening overlying said plate; means for supporting a supply of drapery hooks in alignment with said upper member opening; said lower guide member having a cam slot therein having a rear portion inclined with respect to said front edge, an intermediate portion generally parallel to said front edge; follower means on said plate disposed in said cam slot; and means for reciprocating said plate with respect to said cam slot to cause said plate to move along a path from a first rear position in which said plate opening is in alignment with said upper member opening to allow a hook to shift into said plate opening and be coupled to said plate, to a second rear position at which the pin portion of the hook is disposed adjacent said front edge and inclined to the drape to enable said plate to force the point into the drape, along a path lengthwise of said front edge to a third position at which said pin portion is substantially fully disposed within the drape.

7. In apparatus for inserting hooks in drapes and the like: spaced upper and lower guide members, one of said members having a front edge; a support for a drape adjacent said front edge; a drive plate between and slidable along said members, said plate having an opening to receive a drapery hook provided with a pin portion terminating in a point; said upper member having an opening overlying said plate; means for supporting a supply of drapery hooks in alignment with said upper member opening; said lower guide member having a cam slot therein having a rear portion inclined with respect to said front edge, an intermediate portion generally parallel to said front edge; follower means on said plate disposed in said cam slot; and means for reciprocating said plate with respect to said cam slot to cause said plate to move along a path from a first rear position in which said plate opening is in alignment with said upper member opening to allow a hook to shift into said plate opening and be coupled to said plate, to a second rear position at which the pin portion of the hook is disposed adjacent said front edge and inclined to the drape to enable said plate to force the point into the drape, along a path lengthwise of said front edge to a third position at which said pin portion is substantially fully disposed within the drape; said upper member having an opening alignable with said plate opening when said plate is in said third position to permit said hook to be withdrawn from said plate.

8. In apparatus for inserting hooks in drapes and the like: a support for a drape; a drive member having an opening thereon to receive a drapery hook having a pin portion terminating in a point; means for supporting a supply of drapery hooks; cam means operatively connected to said drive member to guide said drive member along a path from a first position aligned with said supporting means to allow a hook to shift into said drive member opening and be coupled to said drive member, to a second position at which the pin portion of the hook is inclined to the drape to enable said drive member to force the point into the drape, along a path generally lengthwise of the drape to a third position at which said pin portion is substantially fully disposed within the drape and the pin portion is inclined in a direction outwardly of the drape to cause the drive member to force the point of the pin portion back into the drape at said third position; means for reciprocating said drive member with respect to said cam means between said first and third positions; and means for automatically stopping said drive member at said second position and third position.

9. In apparatus for inserting hooks in drapes and the like: spaced upper and lower guide members, one of said members having a front edge; a support for a drape adjacent said front edge; a drive plate between and slidable along said members, said plate having an opening to receive a drapery hook provided with a pin portion terminating in a point; said upper member having an opening overlying said plate; means for supporting a supply of drapery hooks in alignment with said upper member opening; said lower guide member having a cam slot therein having a rear portion inclined with respect to said front edge, an intermediate portion generally parallel to said front edge; follower means on said plate disposed in said cam slot; means for reciprocating said plate with respect to said cam slot to cause said plate to move along a path from a first rear position in which said plate opening is in alignment with said upper member opening to allow a hook to shift into said plate opening and be coupled to said plate, to a second rear position at which the pin portion of the hook is disposed adjacent said front edge and inclined to the drape to enable said plate to force the point into the drape, along a path lengthwise of said front edge to a third position at which said pin portion is substantially disposed within the drape; and means for automatically stopping said plate at said second position and third position.

10. In apparatus for inserting hooks in drapes and the like: a support for a drape; a drive member adapted to receive and be coupled to a drapery hook having a pin portion; cam means operatively connected to said drive member to guide said drive member and hook from a position in which the pin portion is inclined to the drape to enable such portion to be forced by the drive member into the drape, said cam means then guiding said drive member along a path lengthwise of the drape to substantially fully dispose the pin portion in the drape; and spring means mounting said support for yieldable vertical adjustment with respect to said drive member to enable a drape on said support to be forced thereagainst in order to shift the drape to a position in which a drape seam is aligned with the pin portion of the drapery hook.

11. An apparatus for inserting hooks in drapes and the like: a support for a drape; a drive member adapted to receive and be coupled to a drapery hook having a pin portion; cam means operatively connected to said drive member to guide said drive member and hook from a position in which the pin portion is inclined to the drape to enable such portion to be forced by the drive member into the drape, said cam means then guiding said drive member along a path lengthwise of the drape to substantially fully dispose the pin portion in the drape; and means mounting said support in a plane inclined to the plane of movement of said drive member, whereby said support holds the drape with its seam lying in a plane inclined to the plane of the drapery hook when coupled to the drive member.

12. In apparatus for inserting hooks in drapes and the like: a support for a drape; a drive member adapted to receive and be coupled to a drapery hook having a pin portion; cam means operatively connected to said drive member to guide said drive member and hook from a position in which the pin portion is inclined to the drape to enable such portion to be forced by the drive member into the drape, said cam means then guiding said drive member along a path lengthwise of the drape to substantially fully dispose the pin portion in the drape; means mounting said support in a plane inclined to the plane of movement of said drive member, whereby said support holds the drape with its seam lying in a plane inclined to the plane of the drapery hook when coupled to the drive member; and means for shifting said support transversely with respect to the plane of movement of said drive member.

13. In apparatus for inserting hooks in drapes and the like: spaced upper and lower guide members, one of said members having a front edge; a support for a drape adjacent said front edge; a drive plate between and slidable along said members, said plate having an opening to receive a drapery hook provided with a pin portion terminating in a point; said upper member having an opening overlying said plate; means for supporting a supply of drapery hooks in alignment with said upper member opening; said lower guide member having a cam slot therein having a rear portion inclined with respect to said front edge, an intermediate portion generally parallel to said front edge; follower means on said plate disposed in said cam slot; means for reciprocating said plate with respect to said cam slot to cause said plate to move along a path from a first rear position in which said plate opening is in alignment with said upper member opening to allow a hook to shift into said plate opening and be coupled to said plate, to a second rear position at which the pin portion of the hook is disposed adjacent said front edge and inclined to the drape to enable said plate to force the point into the drape, along a path lengthwise of said front edge to a third position at which said pin portion is substantially fully disposed within the drape; and means mounting said support for disposition in a plane inclined with respect to the plane of movement of said plate, whereby said support holds the drape with its seam lying in a plane inclined to the plane of the drapery hook when coupled to the plate.

14. In apparatus for inserting hooks in drapes and the like: spaced upper and lower guide members, one of said members having a front edge; a support for a drape adjacent said front edge; a drive plate between and slidable along said members, said plate having an opening to receive a drapery hook provided with a pin portion terminating in a point; said upper member having an opening overlying said plate; means for supporting a supply of drapery hooks in alignment with said upper member opening; said lower guide member having a cam slot therein having a rear portion inclined with respect to said front edge, an intermediate portion generally parallel to said front edge; follower means on said plate disposed in said cam slot; means for reciprocating said plate with respect to said cam slot to cause said plate to move along a path from a first rear position in which said plate opening is in alignment with said upper member opening to allow a hook to shift into said plate opening and be coupled to said plate, to a second rear position at which the pin portion of the hook is disposed adjacent said front edge and inclined to the drape to enable said plate to force the point into the drape, along a path lengthwise of said front edge to a third position at which said pin portion is substantially fully disposed within the drape; means mounting said support for disposition in a plane, inclined with respect to the plane of movement of said plate, whereby said support holds the drape with its seam lying in a plane inclined to the plane of the drapery hook when coupled to the plate; and means for adjusting the vertical position of said support with respect to said plate.

15. In apparatus for inserting hooks in drapes and the like: spaced upper and lower guide members, one of said members having a front edge; a support for a drape adjacent said front edge; a drive plate between and slidable along said members, said plate having an opening to receive a drapery hook provided with a pin portion terminating in a point; said upper member having an opening overlying said plate; means for supporting a supply of drapery hooks in alignment with said upper member opening; said lower guide member having a cam slot therein having a rear portion inclined with respect to said front edge, an intermediate portion generally parallel to said front edge; follower means on said plate disposed in said cam slot; means for reciprocating said plate with respect to said cam slot to cause said plate to move along a path from a first rear position in which said plate opening is in alignment with said upper member opening to allow a hook to shift into said plate opening and be coupled to said plate, to a second rear position at which the pin portion of the hook is disposed adjacent said front edge and inclined to the drape to enable said plate to force the point into the drape, along a path lengthwise of said front edge to a third position at which said pin portion is substantially fully disposed within the drape; means mounting said support for disposition in a plane inclined with respect to the plane of movement of said plate, whereby said support holds the drape with its seam lying in a plane inclined to the plane of the drapery hook when coupled to the plate; means for adjusting the vertical position of said support with respect to said plate; and means for automatically stopping said plate at said second position and third position.

16. In apparatus for inserting hooks in drapes and the like: a drive member adapted to receive and be coupled to a drapery hook having a pin portion; a support having a substantially plane surface generally parallel to the plane of movement of said drive member and upon which the drape can be held with its plait in a folded condition and the seam of the drape facing toward the drive member; means for adjusting said support to place said surface in an offset relation to the plane of movement of said drive member and the seam of the drape in substantial alignment with the plane of movement of said drive member; cam means operatively connected to said drive member to guide said drive member and hook from a position in which the pin portion is inclined to the drape to enable such portion to be forced by the drive member into the drape seam, said cam means then guiding said drive member along a path lengthwise of the drape to substantially fully dispose the pin portion in the drape.

17. In apparatus for inserting hooks in drapes and the like: a substantially horizontally disposed drive member adapted to receive and be coupled to a drapery hook having a pin portion; a support having a substantially horizotnal surface upon which the drape can be held with its plait in a folded condition and the seam of the drape facing toward the drive member; means for vertically adjusting said support to place its horizontal surface in a plane below the horizontal plane of movement of said drive member and the seam of the drape in substantial alignment with the horizontal plane of movement of said drive member; cam means operatively connected to said drive member to guide said drive member and hook from a position in which the pin portion is inclined to the drape to enable such portion to be forced by the drive member into the drape seam, said cam means then guiding said drive member along a path lengthwise of the drape to substantially fully dispose the pin portion in the drape.

18. In apparatus for inserting hooks in drapes and the like: upper and lower generally horizontally disposed guide members, one of said members having a front edge; a generally horizontally disposed support for a drape adjacent said front edge; a drive plate between and slidable along said members, said plate having an opening to receive a drapery hook provided with a pin portion terminating in a point, said upper member having an opening overlying said plate; means for supporting a vertical stack of drapery hooks above and in alignment with said upper member opening; means providing a slidable cam connection between said drive plate and one of said members to guide said plate along a path from a first position in which said plate opening is aligned with said upper member opening to allow a hook from the stack to drop into said plate opening and be coupled to said plate, to a second position at which the pin portion of the hook is inclined to the drape to enable said plate to force the point into the drape, along a path lengthwise of said front edge to a third position at which said pin portion is substantially fully disposed within the drape; and means for reciprocating said plate along said guide members between said first and third positions.

19. In apparatus for inserting hooks in drapes and the like: a support for a drape; a drive member having an opening thereon to receive a drapery hook having a pin portion terminating in a point; means for supporting a supply of drapery hooks; cam means operatively connected to said drive member to guide said drive member along a path from a first position aligned with said supporting means to allow a hook to shift into said drive member opening and be coupled to said drive member, to a second position at which the pin portion of the hook is inclined to the drape to enable said drive member to force the point into the drape, along a path generally lengthwise of the drape to a third position at which said pin portion is substantially fully disposed within the drape, means for reciprocating said drive member with respect to said cam means between said first and third positions; and means for automatically stopping said drive member at said second position.

20. In apparatus for inserting hooks in drapes and the like: a support for a drape; a drive member adapted to receive and be coupled to a drapery hook having a pin portion; cam means operatively connected to said drive member to guide said drive member and hook from a position in which the pin portion is inclined to the drape to enable such portion to be forced by the drive member into the drape, said cam means then guiding said drive member along a path lengthwise of the drape to substantially fully dispose the pin portion in the drape; and means for positioning a drape on said support with the drape seam lying in a plane inclined to the plane of movement of said drive member and of the drapery hook coupled thereto and with a portion of the seam aligned with the pin portion of the drapery hook.

21. In apparatus for inserting hooks in drapes and the like: a generally horizontally disposed support for a drape; a generally horizontally arranged drive member adapted to receive and be coupled to a drapery hook having a pin portion; cam means operatively connected to said drive member to guide said drive member and hook from a position in which the pin portion is inclined to the drape to enable such portion to be forced by the drive member into the drape, said cam means then guiding said drive member along a path lengthwise of the drape to substantially fully dispose the pin portion in the drape; means for positioning a drape on said support with the drape seam lying in a plane inclined to the generally horizontal plane of movement of said drive member and of the drapery hook coupled thereto and with a portion of the seam aligned with the pin portion of the drapery hook; and means for vertically shifting said support with respect to the generally horizontal plane of movement of said drive member to align the drapery seam with the pin portion of the drapery hook.

*22. In apparatus for inserting hooks in drapes and the like: a drive member adapted to receive and be coupled to a drapery hook having a pin portion; means operatively connected to said drive member to drive said drive member and hook from a rearward position in which the pin portion is inclined to the drape to enable the pin portion to be forced into the drape, said means then guiding said drive member along a path lengthwise of the drape to a forward position in which the pin portion is substantially fully disposed in the drape; and means for bodily translating said drive member between said rearward and forward positions.*

*23. In apparatus for inserting hooks in drapes and the like: a drive member adapted to receive and be coupled to a drapery hook having a pin portion; means opertively connected to said drive member to drive said drive member and hook from a rearward position in which the pin portion is inclined to the drape to enable the pin portion to be forced into the drape, said means then turning said drive member to correspondingly turn the pin portion to a position lengthwise of the drape, said means then guiding said drive member along a substantially straight path lengthwise of the drape to a forward position in which the pin portion is substantially fully disposed in the drape; and means for shifting said drive member between said rearward and forward positions.*

*24. In apparatus for inserting hooks in drapes and the like: spaced upper and lower guide members; a drive plate between and slidable along said members, said plate having an opening to receive a drapery hook provided with a pin portion terminating in a point; said upper member having an opening overlying said plate; means for supporting a supply of drapery hooks in alignment with said upper member opening; said lower guide member having a cam slot therein; follower means on said plate disposed in said cam slot; and means for reciprocating said plate with respect to said cam slot to cause said plate to move along a path between a position in which said plate opening is in alignment with said upper member opening, to allow a hook to shift into said plate opening and be coupled to said plate, and a position at which the pin portion is substantially fully disposed within the drape.*

*25. In apparatus for inserting hooks in drapes and the like: spaced upper and lower guide members; a drive plate between and slidable along said members, said plate having an opening to receive a drapery hook provided with a pin portion terminating in a point; said upper member having an opening overlying said plate; means for supporting a supply of drapery hooks in alignment with said upper member opening; means operatively connected to said drive plate to guide said drive plate and hook from a rearward position in which said plate opening is in alignment with said upper member opening, to allow a hook to move into said plate opening and be coupled to said plate, along a path lengthwise of a drape to a forward position at which the pin portion is substantially fully disposed within the drape; and means for bodily translating said drive plate between said rearward and forward positions.*

*26. In apparatus for inserting hooks in drapes and the like: a drive member adapted to be coupled to a drapery hook having a pin portion; means operatively connected to said drive member to drive said drive member and hook from a rearward position in which the pin portion is inclined to the drape to a forward position in which the pin portion is substantially fully disposed in the drape; and work aligning means in substantial alignment with the pin portion when the hook is in the rearward poistion against which the drapery seam can be placed with the work aligning means disposed in said seam to align the seam with the pin portion of the hook.*

*27. In apparatus for inserting hooks in drapes and the*

*like: a drive member adapted to be coupled to a drapery hook having a pin portion; means operatively connected to said drive member to drive said drive member and hook from a rearward position in which the pin portion is inclined to the drape to a forward position in which the pin portion is substantially fully disposed in the drape; and work aligning means in substantial alignment with the pin portion when the hook is in the rearward position against which the drapery seam can be placed with the work aligning means disposed in said seam to align the seam with the pin portion of the hook, said work aligning means being disposed in such position that the pin portion of the hook moves along the inner portion of the work aligning means during movement of said drive member from its rearward to its forward position.*

*28. In apparatus for inserting hooks in drapes and the like: a drive member adapted to be coupled to a drapery hook having a pin portion; means operatively connected to said drive member to drive said drive member and hook from a rearward position in which the pin portion is inclined to the drape to a forward position in which the pin portion is substantially fully disposed in the drape; and yieldable work aligning means in substantial alignment with the pin portion when the hook is in the rearward position against which the drapery seam can be placed with the work aligning means disposed in said seam to depress the work aligning means inwardly and to align the seam with the pin portion of the hook.*

References Cited in the file of this patent or the original patent

UNITED STATES PATENTS

| | | |
|---|---|---|
| 1,940,980 | Svenson | Dec. 26, 1933 |
| 2,403,222 | Howel's | July 2, 1946 |
| 2,403,947 | Oussani | July 16, 1946 |
| 2,643,307 | Geel | June 23, 1953 |
| 2,692,382 | Raphael | Oct. 26, 1954 |